P. J. McGRATH.
SHOE SOLE LEVELING MACHINE.
APPLICATION FILED OCT. 19, 1917.
1,304,078.
Patented May 20, 1919.
4 SHEETS—SHEET 3.
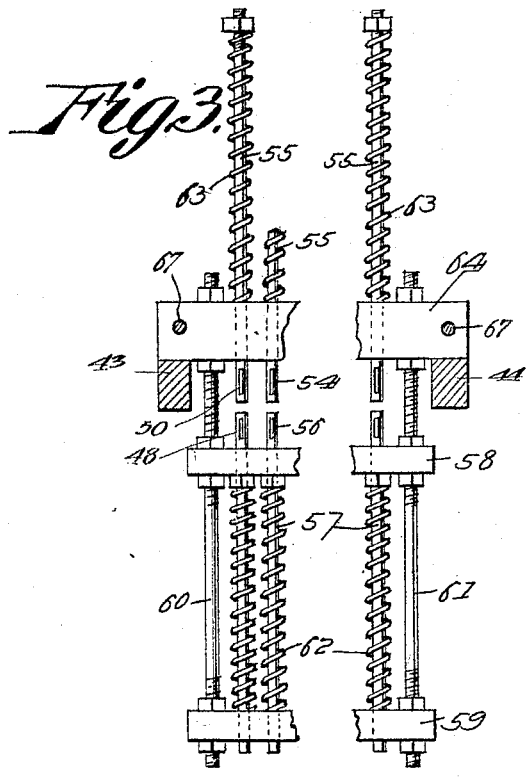
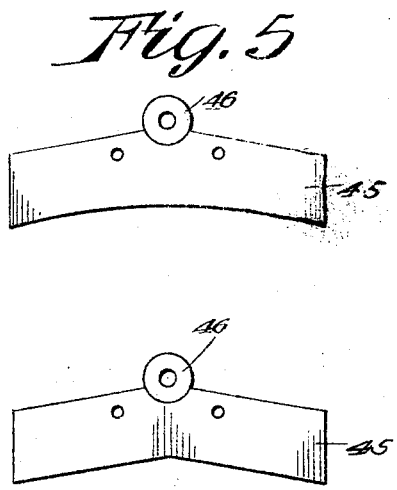
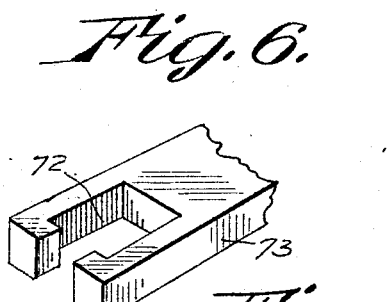
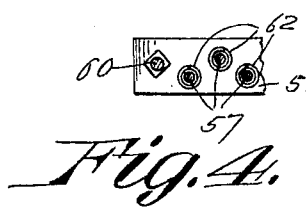
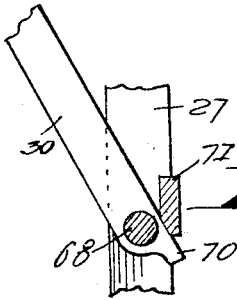
Inventor
Patrick J. McGrath
By _____
Attorneys P. J. McGRATH.
SHOE SOLE LEVELING MACHINE.
APPLICATION FILED OCT. 19, 1917.
1,304,078.
Patented May 20, 1919.
4 SHEETS—SHEET 4.
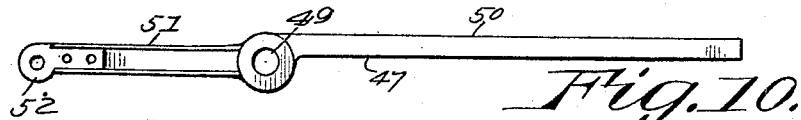
Fig. 10.
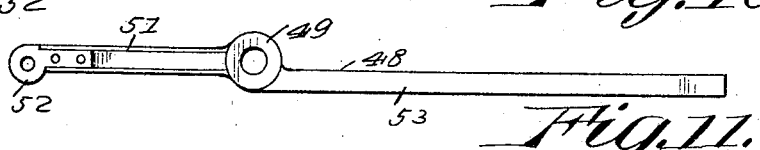
Fig. 11.
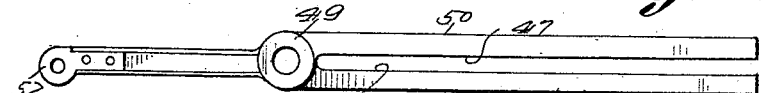
Fig. 12.
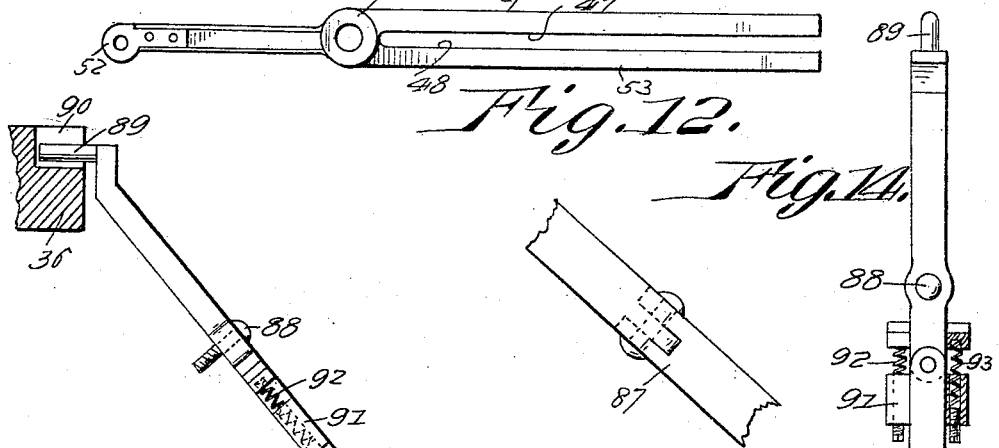
Fig. 13.
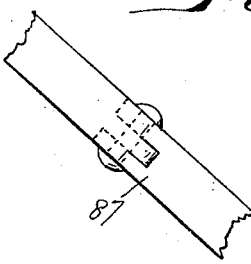
Fig. 15.
Fig. 14.
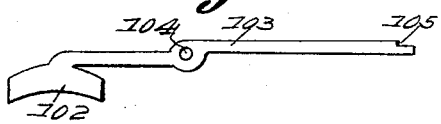
Fig. 16.
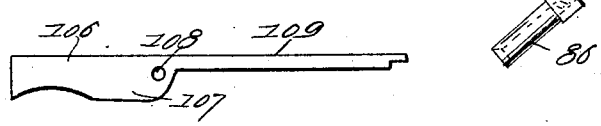
Fig. 17.
Inventor
Patrick J. McGrath
By *[signature]*
Attorneys

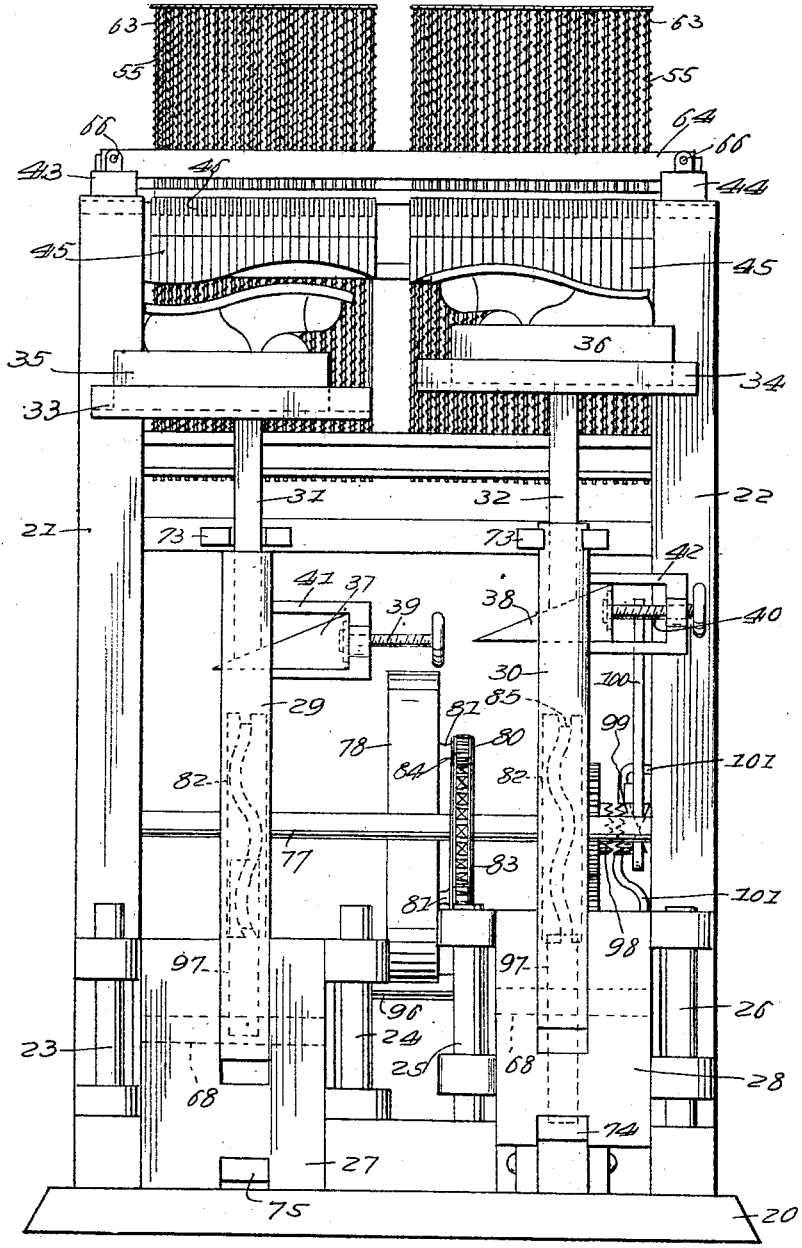

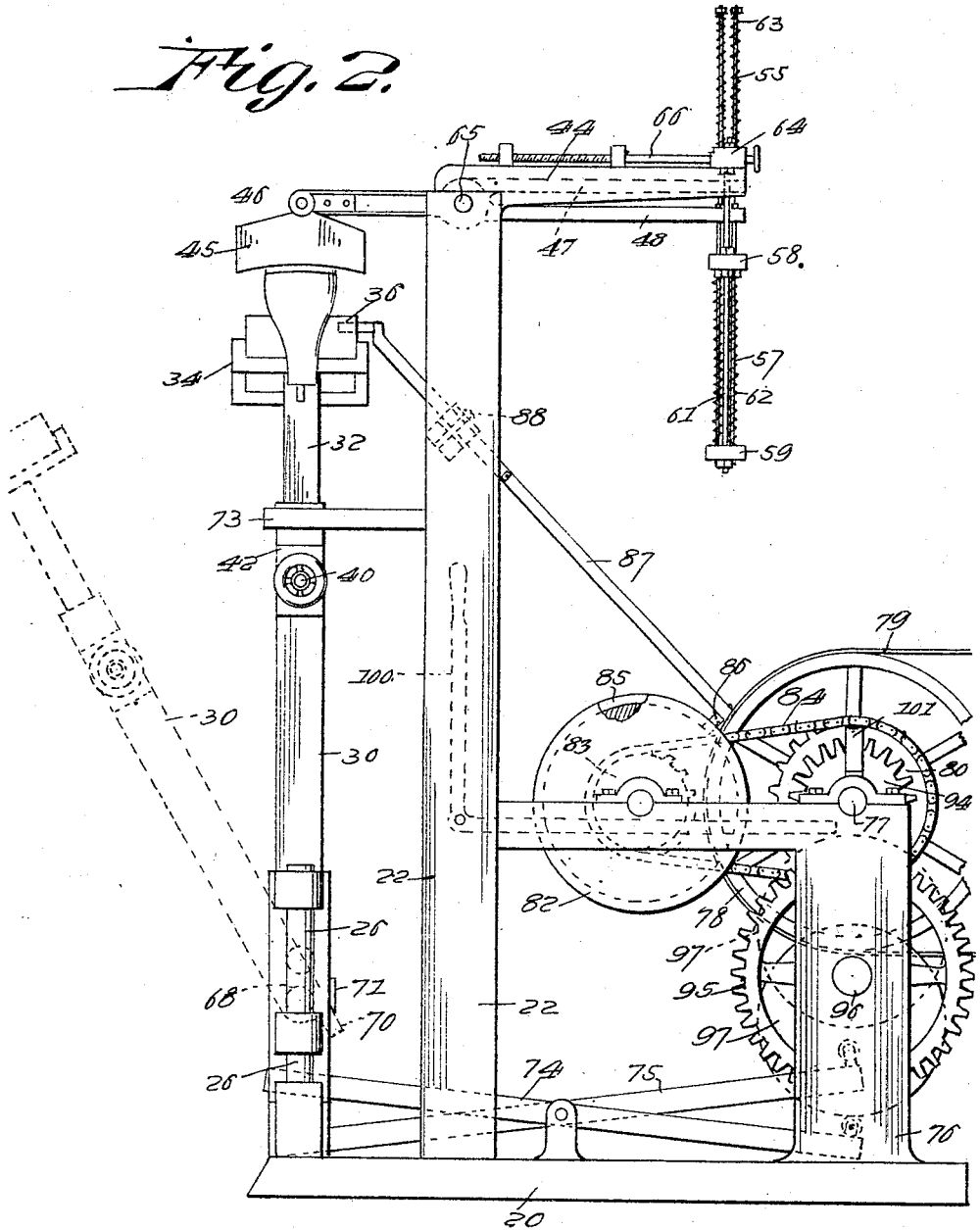

UNITED STATES PATENT OFFICE.

PATRICK J. McGRATH, OF PHILADELPHIA, PENNSYLVANIA, ASSIGNOR OF ONE-HALF TO WILLIAM BUTLER, JR., OF PHILADELPHIA, PENNSYLVANIA.

SHOE-SOLE-LEVELING MACHINE.

1,304,078. Specification of Letters Patent. Patented May 20, 1919.

Application filed October 19, 1917. Serial No. 197,480.

*To all whom it may concern:*

Be it known that I, PATRICK J. McGRATH, a citizen of the United States, residing at Philadelphia, county of Philadelphia, State of Pennsylvania, have invented certain new and useful Improvements in Shoe-Sole-Leveling Machines, of which the following is a specification.

This invention relates to sole leveling machines for shoes and one of the objects of the invention is to provide a machine of the class described which may be operated without special previous skill and without special muscular effort on the part of the attendant and without the liability of stretching the uppers or starting the seams.

Sole leveling machines heretofore generally constructed have involved certain objectionable characteristics for example, the construction of the machines were generally such that they could only be operated by skilled mechanics, and not infrequently the uppers would become stretched, or the seam started to the detriment of the finished sole. As heretofore practised, it has also been necessary in leveling shoes to exert a certain amount of muscular pressure against the leveling tool so that operators of relatively slight build were unavailable for this class of work.

It is a purpose of my invention to eliminate the disadvantages above enumerated and to provide a machine which will be simple in construction, easily operated, and efficiently perform the functions for which it is intended.

Figure 1 is a front elevational view of a machine constructed in accordance with my invention;

Fig. 2 is a side view of the same;

Fig. 3 is a fragmentary view of a tension frame showing the tension rods in place;

Fig. 4 is a fragmentary plan view of one of the tension rod guides;

Fig. 5 is a detail view of one form of leveling tool or mold plate;

Fig. 6 is a similar view of a different form of mold plate;

Fig. 7 is a top view of the mold showing the plates assembled;

Fig. 8 is a detail perspective view of the work-carrier lock;

Fig. 9 is a detail view of the stop for limiting the swinging movement of the work-carrier standard;

Fig. 10 is a side elevational view of one of the mold plate supports;

Fig. 11 is a similar view of an accompanying mold plate support;

Fig. 12 is an elevational view of two accompanying plate supports assembled together;

Fig. 13 is a side elevational view of a vibratory for the work-carrier;

Fig. 14 is a view of the vibratory;

Fig. 15 is a detail view of the break joint connecting two parts of the vibratory;

Fig. 16 is a detail view of a modified form of mold plate and its support; and

Fig. 17 is a still further modified form.

Referring now to the drawings by numerals of reference, 20 designates a base on which are the standards 21 and 22 supporting the mold mechanism and in front of the standards are two sets of guide rods 23 and 24 and 25 and 26 respectively which guide the vertically reciprocatory blocks 27 and 28 on which are the standards 29 and 30 which in turn carry the work supporting bars 31 and 32. The bars 31 and 32 carry the work holders 33 and 34 in which are lateral reciprocatory work forms or jacks 35 and 36, the bars 31 and 32 being adapted to be raised and lowered with respect to the standards 29 and 30 through the medium of the wedges 37 and 38 the wedges being actuated through the medium of the screws 39 and 40 threaded in the brackets 41 and 42. The standards 21 and 22 have laterally projecting arms 43 and 44 which support tension frames best shown in Fig. 3, the tension frames being so constructed that the desired degree of tension will be exerted upon the pivoted mold members or plates which constitute the mold shown in Fig. 7. The mold members are shown as consisting of numerous thin plates 45, sufficiently deep to give stiffness as to vertical strains, and having their under edges to conform to the work to be treated and each plate is shown as being provided with a perforated ear 46 so that the alternating plates may be connected to the ends of alternately disposed supporting bars 47 and 48. The bars 47 and 48 are best shown in Figs. 10 and 11, the upper one consisting of an intermediate perforated portion 49 with an upper offset end 50 and a forwardly extending portion 51 having a perforated ear 52 adapted to be fastened to the ear 46 of the plate 45. The lower bar shown in Fig. 11 is of substantially the same construction as the bar shown in Fig. 10 except that the offset portion 53 corresponding to the offset portion 50 of the upper bar is in reverse position so that the two bars may be brought together as shown in Fig. 12 and the ends of the offset portion may be introduced into the slotted ends 54 of the upper tension rods 55 or the slotted portions 56 of the lower tension rods 57. The tension rods are held in a frame consisting of the cross bars 58 and 59 and the tie bars 60 and 61 for the lower tension devices, there being springs 62 to oppose the supports 48, the upper tension bars also being provided with springs 63 which bear against the cross bar 64 resting upon the extensions 43 and 44 of the standards 21 and 22. When the supporting bars 48 are pivoted to the standard by the rod 65, a limited vertical movement may be imparted to the plates 45 to conform to the shape of the work to be operated upon and the tension frame may be adjusted longitudinally on the supports 43 and 44 by the rods 66 and 67. The standards 29 and 30 are pivoted to the sliding blocks 27 and 28 as best shown at 68 Fig. 9 and are provided with extensions 70 which may abut against the stops 71 so that they may swing out to a limited degree as best shown in Fig. 2. The provision for swinging out the standards is for the purpose of permitting the work (in the present instance a shoe) to be applied to and removed from the work holder. When the work is being acted upon, however, the standard will be in its raised position and be held against swinging movement on account of its being introduced into the opening 72 of its particular lock bar 73 best shown in Fig. 8, in which instance, the standard will be held against any lateral movement. The standards are raised and lowered by the pivoted cam actuated bars 74 and 75 (see Fig. 2) which are acted upon by cams driven through a suitable mechanism which I will now describe. In rear of the standards 21 and 22 are pillow blocks 76 which support a transverse shaft 77 on which is a pulley 78 adapted to receive motion from a suitable power source through the medium of the belt 79. The pulley 78 carries a sprocket wheel or pulley 80 secured thereto by the brackets 81 and the sprocket wheel or pulley 79 drives a wheel 82 through the medium of the sprocket 83 and chain 84. The wheel 82 is provided with a cam groove 85 which receives an engaging finger 86 on the vibrating rod 87, pivoted at 88 and having a finger 89 which engages in a recess 90 in the sliding work holder 36. The form of vibrating rod is best shown in Figs. 13 and 14, said rod being provided with a break joint 91. This joint is formed by bringing together the two sections of the rod 87, and providing, adjacent to the hinge, offsets on each rod-section, between which are arranged adjustable springs 92, 93, so that in the event that the work holder is held against movement the two ends of the rod 87 may yield relatively through said break joint. Under ordinary conditions, however, the two springs 92 and 93 will hold the two parts of the rod in line with sufficient rigidity so that in effect it will be as one rod. On the shaft 77 is a gear 94 which meshes with a gear 95 on the shaft 96 in the pillow blocks below the shaft 77 and said gear 95 carries a cam 97 for one of the pivoted levers 74 or 75 in the event that there is only one work holder. Where there are two or more work holders, however, an additional gear 94 may mesh with an additional gear 95 carrying an additional cam 97 for each additional lever. It will be observed by reference to Fig. 2 that when the cam comes into contact with the end of the lever 74 or 75 as the case may be, the lever is depressed causing the standard which it actuates to be raised to bring the work into contact with the leveling plates or "mold". The work will be held in contact with the leveling plates or mold during the time required for the cam to pass over the end of the lever and during this time the rod 87 will be vibrated in a lateral plane so as to give a lateral sliding movement of the work or shoe support against the mold or plates. When the cam has passed off the end of the lever the standard which has just previously been raised will drop a sufficient distance to permit disengagement with the end 89 of the vibrating bar or rod and to move out of engagement with the lock 73 so that the standard may swing into position shown in dotted lines in Fig. 2 whereup the treated work may be removed and work to be treated may be substituted. In cases where there are two standards with corresponding mechanism, I prefer to so arrange the construction that when one standard is raised to a position to maintain the work into engagement with the mold, the other standard will be in non-operative position so that one operator may take care of two standards and its appurtenances. The degree of tension exerted upon the plates 45 will be determined by the position of the tension members with respect to the levers 48 for if the tension mechanism is at the end of the levers the resistance to work against the plates will be greater, whereas, if it is nearer the pivotal point 68 the resistance will be less. In order to throw the mechanism into and out of operation I have shown a clutch consisting of the members 98 and 99, the latter being shiftable through the lever 100 so that when the two clutch members are brought together, the wheel 82 will rotate, but when the shaft has rotated one half revolution, a throw out cam 101 will retract the clutch member 99 and the rotation of the wheel 82 will be stopped.

Fig. 16 shows a modified form of mold plate and its support in which the mold plate 102 is rigid with its supporting arm 103 and is provided with an opening 104 corresponding to the opening 49 in the form of support shown in Figs. 10, 11 and 12, the rear end 105 of the support being adapted for engagement with the spring frame. In Fig. 17 the mold plate 106 is shown with a thickened portion 107 having a pivot opening 108 and a rearward extension 109 having engagement with the spring frame.

By arranging the plates as shown and described it will be apparent that the mold or leveling plates consisting of a plurality of vertically yielding elements whose edges press against the sole and each plate of which is controlled by a separate spring or springs, will enable the mold to conform to the shape of the work to be treated and that the desired result may be quickly and conveniently accomplished without special skill on the part of the operator and without any special muscular effort on his part inasmuch as the required pressure is exerted by the machine elements.

The construction of the machine heretofore described embodies the preferred form of my invention, it being understood, however, that changes in form, proportion and minor details of construction may be resorted to without departing from the spirit of the invention or sacrificing any of its advantages.

I claim:—

1. In a shoe leveling machine, the combination of a mold form comprising a series of thin, stiff mold plates arranged to present their edges to the work, and means for imparting spring pressure to individual plates to hold all of the plates within the range of the size of the sole being operated upon, constantly and resiliently against the sole during the leveling operation.

2. In a shoe leveling machine, the combination of a mold form comprising a series of mold plates, a series of supporting levers individually supporting said plates, and means for imparting spring pressure to the individual levers to hold all of the plates within the range of the size of the sole being operated upon, constantly and resiliently against the sole during the leveling operation.

3. In a shoe leveling machine, the combination of a mold form comprising a series of mold plates, a series of supporting levers hingedly supporting the individual plates, and means for imparting spring pressure to the individual levers.

4. In a shoe sole leveling machine, the combination of a mold form, a work support having capacity for lateral movement, and automatically operated means operative during the leveling action for imparting lateral movement to said work support, comprising a rod formed in sections yieldingly held relatively to lineal position.

5. In a shoe sole leveling machine, the combination of a mold form, a work support having capacity for lateral movement, and automatically operated means operative during the leveling action for imparting lateral movement to said work support, means for elevating said work support, the lateral movement imparting means being so related to the work support as to be disengaged therefrom when the work support is lowered and swung outward.

6. In a shoe leveling machine, the combination of a mold form, a work support, a standard therefor having hinged support, means for elevating the standard, and means for locking said standard in operative position with reference to the mold form when in elevated position and for unlocking it and enabling it to swing away from the mold form when in lowered position.

The foregoing specification signed at Philadelphia, Penna., this twenty-seventh day of August, 1917.

PATRICK J. McGRATH.

Copies of this patent may be obtained for five cents each, by addressing the "Commissioner of Patents, Washington, D. C."